UNITED STATES PATENT OFFICE.

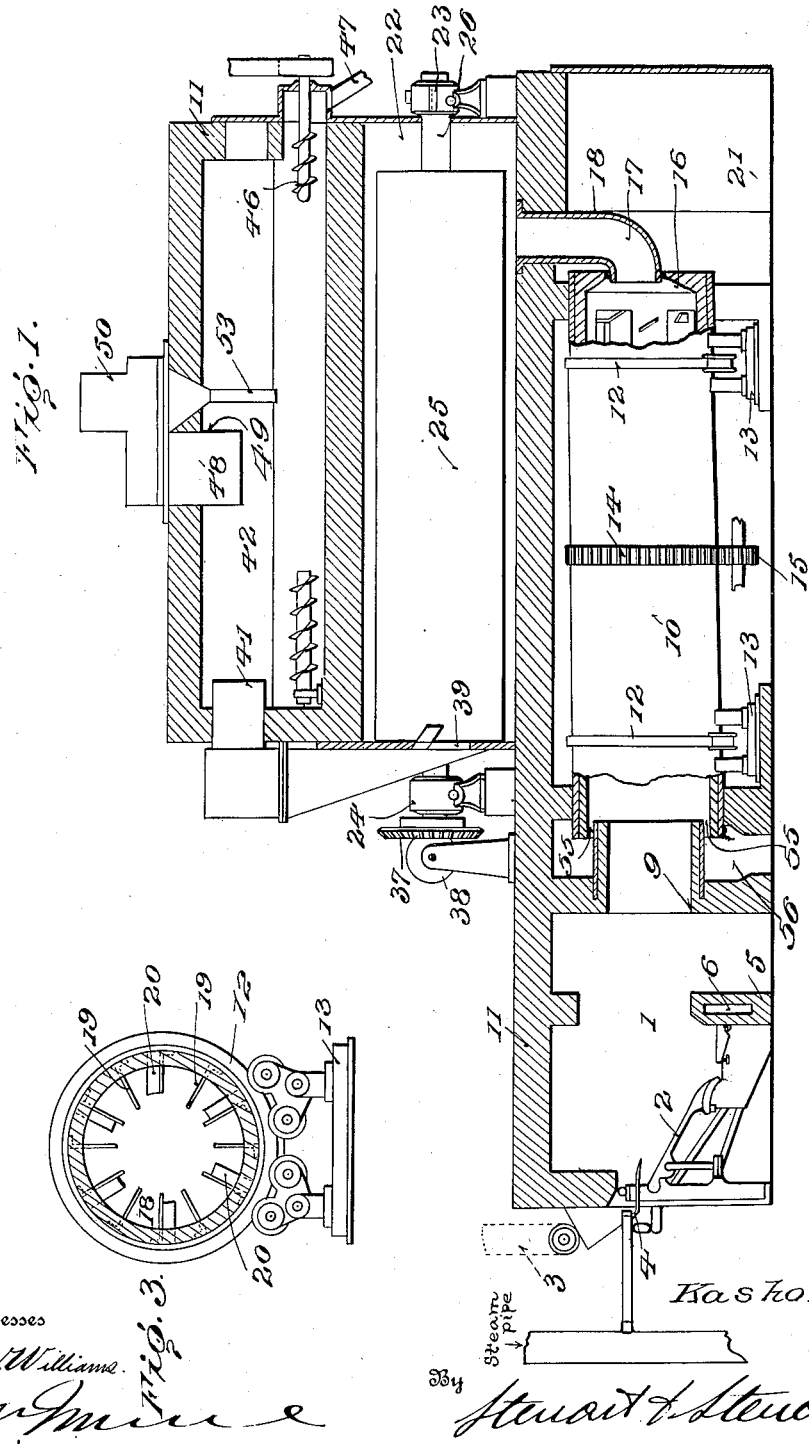

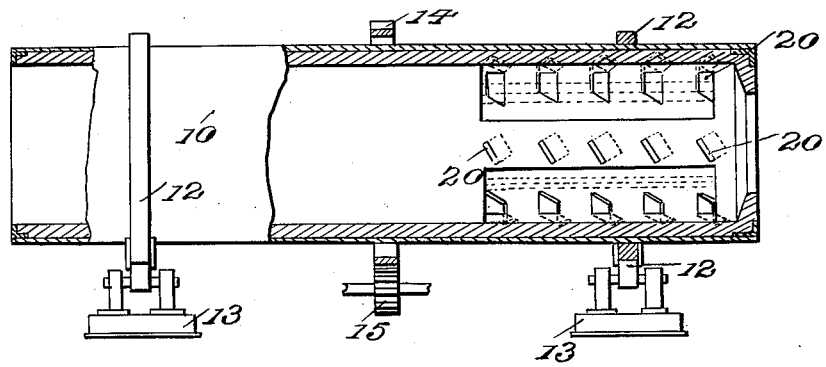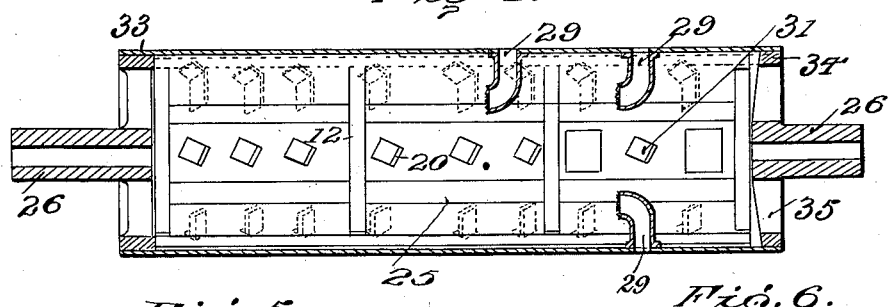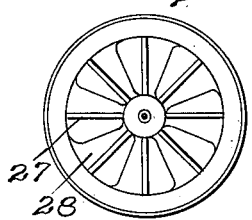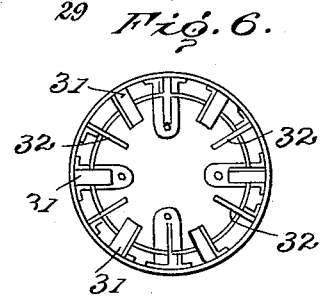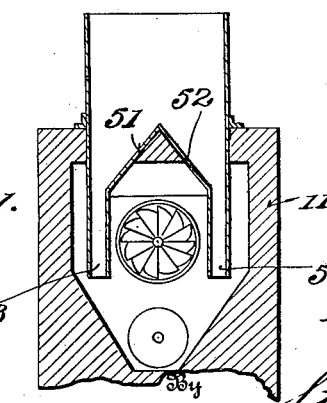

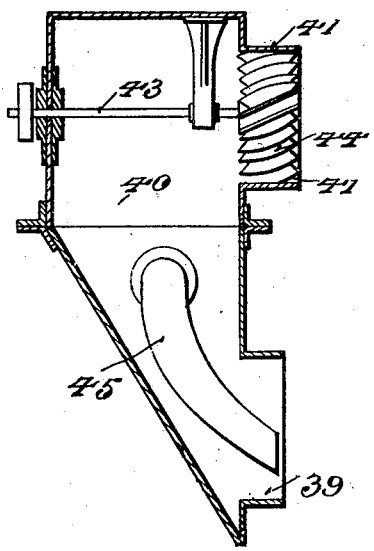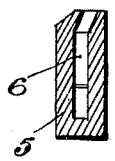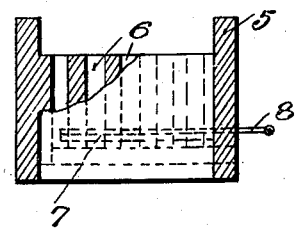

KASHO TSUJI, OF TAKAOKA, IOYAMA, JAPAN.

DRIER.

940,908.

Specification of Letters Patent.

Patented Nov. 23, 1909.

Application filed April 4, 1908, Serial No. 425,264. Renewed October 19, 1909. Serial No. 523,431.

*To all whom it may concern:*

Be it known that I, KASHO TSUJI, a subject of the Emperor of Japan, residing at Takaoka, Ioyama, Japan, have invented certain new and useful Improvements in Driers, of which the following is a specification.

The present invention relates to driers and has as an object the provision of a device of this nature, in which economy of heat and efficiency are increased, and the loss of the product in the form of dust reduced.

The material to be dried is presented to the apparatus at a point remote from that at which the drying medium or products of combustion enter and is gradually advanced toward the latter point and leaves the machine by an opening adjacent thereto, while the products of combustion leave the drier and enter a settling chamber near the point where the material is introduced. Thus, the drying medium at its highest temperature comes into contact with the material when the process of drying is almost complete, giving the highest degree of dryness, and as it cools passes over portions of the material containing successively more and more moisture until as it is released it meets that which is being introduced. Thus, gases which are at a temperature and humidity at which they would take up no moisture from a substance, which is in a condition approaching dryness, are utilized by being directed into contact with the raw material.

Referring to the drawings,—Figure 1 is a vertical, longitudinal cross-section of the drier, partly in side elevation, partly in longitudinal section. Fig. 2 is a section of the primary container, showing the means for supporting and actuating the same. Fig. 3 is a transverse cross-section of the primary container showing its anti-friction support. Fig. 4 is a longitudinal cross-section of the secondary container. Fig. 5 is an end view of the same, looking from the left of Fig. 4, and Fig. 6 is a transverse cross-section. Fig. 7 illustrates a detail of the secondary container. Figs. 8 and 9 are detailed views of the bridge wall. Fig. 10 is a cross-section of the fan chamber, showing the conductor, and Fig. 11 is a transverse cross-section of the settling chamber.

In the embodiment of my invention illustrated, the elements of the device to be hereinafter described, are inclosed within and supported by a structure (11) of concrete, fire brick or other suitable material. The source of heat is a furnace (1), forming part of this structure. It is provided with inclined grate bars (2) and supplied with fuel by any convenient means as the automatic stoker (3). A nozzle (4) is connected with a steam supply and adapted to inject steam in suitable quantities. The bridge wall (5) is perforated at 6 as illustrated in Figs. 8 and 9 to provide passages by means of which air is supplied. These passages are controlled by means of a series of valves (7) mounted on a rod (8). The valves are adapted to slide into suitable openings in the walls of the passage ways (6), so that the size of the passages may be regulated by sliding the rod (8) longitudinally. A pipe (9) lined with fire brick, opens into the furnace and extends backward. The primary container (10) at the rear of the furnace is cylindrical in form. An opening lined with fire brick at the front end receives the pipe, (9), the diameter of the opening exceeding the external diameter of the pipe by an extent sufficient to afford a passageway for the material. A flat ring (12) is provided near each end of the container and supports (13) carry coöperating flanged wheels, the grooves in the circumference of which engage the bearing rings and receive both the vertical and lateral stresses. Intermediate of its ends the container is encircled by a toothed ring (14). A gear (15) journaled on the frame engages the teeth whereby the container is rotated, means for driving the gear (15), which is thought unnecessary to illustrate, being provided. The rear end of the primary container is apertured at 16 concentrically with its axis to receive the horizontal end (17) of the conductor (18) leading from the chamber next above to be later described.

Referring to Fig. 3, it will be noted that the primary container is provided with horizontally extending, radially disposed plates (19) secured to the inner walls of the cylinder. These members will be hereinafter termed "raiser" plates. Secured to the inner walls of the container intermediate the receiver plates (19) and helically disposed about the axis of the cylinder are conveyer plates (20). The rear portion only of the container is provided with raiser and conveyer plates, the surface of the front portion being free so the material may be distributed thereover.

Next above the primary container chamber (21), and communicating therewith by means of the conductor (18) is the secondary container chamber (22). Rotatably mounted therein is the secondary container (25) provided with hollow axially placed journals (26) engaging the external bearings (23—24). The end of this cylinder (at the left in Fig. 1) at which the material is to be admitted, and which will hereinafter be termed the "rear" end, is supplied with helically disposed plates (27) separated by radial openings (28). The forward portion of the cylinder (Fig. 4) is supplied with radially disposed pipes (29) secured to the walls and opening into the container chamber. The inner ends of these pipes are bent to extend longitudinally of the cylinder disposed rearwardly and covered by means of suitable screens (30) as indicated in Fig. 7. These pipes (29) will be termed "elbows". Raiser and conveyer plates (31—32), similar to those described in connection with the primary container, extend substantially the whole length of the secondary container between the end walls (33—34). The end wall (34) is apertured at 35 for the passage of material and the drying medium, and the journal (26) is provided with the necessary driving gear (37) meshing with the gear (38) mounted on the frame and rotated by suitable means not illustrated.

The rear end of the secondary container chamber (22) is apertured at (39) forming the entrance to a fan chamber (40) (see Fig. 10) communicating by means of a passageway (41) with a chamber (42), placed over the secondary container chamber and hereinafter termed a "settling" chamber. Mounted in the passageway (41) on a shaft (43) adapted to rotate in suitable bearings, is a fan or blower (44). A pipe or conductor (45) for the material enters the secondary container chamber at the opening (39). The settling chamber (42) is provided in its lower portion with a helical conveyer (46) rotated by any suitable means, and leading to an outlet passage (47) by which the dust deposited in the chamber may be returned to the supply or to the product. The upper wall of the chamber is apertured at 48 to receive a depending pipe (49), which leads to the stack (50), which is slightly offset therefrom. The roof of the chamber at the base of the stack is in the form of two intersecting inclined planes (51—52) which terminate in vertical pipes (53—54) emptying into the settling chamber.

In the operation of my device the action of the blower (44) tends to create a draft from the furnace through the primary conveyer to the rear (see Fig. 1); by way of the passageway (18) to the secondary container chamber (22) through the elbows (29) and the passages (35) to and through the secondary container to the fan chamber, thence to the settling chamber and the stack. Fuel is supplied to the furnace by means of the automatic stoker (3) and steam and air in suitable quantities to give complete combustion are admitted by means of the nozzle (3) and the passages (6). The products of combustion pass upward through the containers to the settling chamber and the stack in the direction of the draft, as described. The material to be dried is supplied by any suitable means to the pipe (45), from which it enters the secondary container. The latter is continuously rotated on its bearings by means of the gears (37 and 38). The material, as presented, is engaged first by the helically disposed radial plates (27) and advanced into the secondary container where it is engaged by the raiser plates (32) and carried upward by the rotation of the cylinder. As each raiser plate reaches a predetermined position in its path of rotation, its angle becomes such that its load is discharged and falls. Part of the falling material necessarily comes in contact with the helically disposed conveyer plates and is advanced in a direction opposite to that of the draft current, previously described. The continuous rotation of the cylinder gives a feed of the material, which may be regulated in extent by the pitch of the conveyer plates and the speed of rotation of the cylinders.

At the rear of the container the material is delivered into the chamber (22), where it is gradually forced by accumulation in the direction of the passage (18), from which it enters the primary container. The latter, as previously described, is continuously rotated by means of the gear (15) engaging the toothed ring (14). The raiser and conveyer plates in the rear end of this container operate to advance the material as described in connection with the secondary container. The front end of the primary container is not provided with these plates, but the material is permitted to spread over the surface of the cylinder lining, which is heated to a high degree by coming in contact with the products of combustion immediately on their exit from the furnace. The aperture (55) between the cylinder and the passageway (9) permits the material to pass out of the container and leave the drier by way of the conductor (56). As the products of combustion approach the chimney, they are introduced into the settling chamber and are permitted to become substantially stationary. Here, the dust which has been taken up in the various drying chambers is deposited and the gases pass out at the stack (50). The provision of the depending pipe (49) tends to prevent formation of a direct current through the settling chamber. The inclined walls (51—52) at the base of the stack conduct the material, which settles therein, by way of the pipes (53—54) to the settling chamber. The conveyer (46) serves to eject the dust automatically by means of the passageways (47).

It will be apparent that the material as it passes through the secondary container to the primary container, and through the latter to the outlet conductor (56) gradually loses its moisture and that this material as it approaches dryness is subjected to the products of combustion at their highest temperature and their lowest humidity. As the products of combustion advance and approach saturation, they are brought in contact with portions of the material containing more and more moisture; therefore, as the capacity of the gases to take up moisture decreases, they act on material which gives up its moisture more readily; and, the drying capacity of the gases is utilized to the greatest possible extent.

Having thus described my invention, what I claim and desire to secure by Letters Patent is,—

1. In a drier, a plurality of relatively rotating containers, each externally disposed in regard to every other, a settling chamber, means in the containers for advancing material, means for circulating the drying medium, a passage for the material and drying medium connecting each chamber to the next, a passage at one end of the containers leading to the settling chamber, and means adjacent the passage for removing drying medium from the drier.

2. In a drier, a plurality of relatively rotating containers, each externally placed in regard to every other, means for moving the material through the containers, including conveyer plates in one container distributed over a portion only of its longitudinal extent, means for conducting material and drying medium from one container to the next, and means for circulating the drying medium.

3. In a drier, a source of heat, a container one end of which is in communication with the heat source, raiser plates and conveyer plates near the other end of the container and means for rotating the container the inner surface of the container adjacent the heat source being plane.

4. In a drier, a source of heat, a rotating container in communication with the heat source, conveyers in the portion of the container remote from the source of heat, a portion of the container adjacent the heat source having a free surface over which the material may be distributed.

5. In a drier, a rotating container, a source of heat, raiser plates in the portion of the container remote from the heat source, conveyer plates intermediate the raiser plates, a portion of the container surface adjacent the heat source being free for the distribution of the material.

6. In a drier, a rotating container, a source of heat, raiser plates in the portion of the container remote from the heat source, conveyer plates intermediate the raiser plates, a portion of the container surface adjacent the heat source being free for the distribution of the material, and means for creating a draft in a direction opposite to that in which the material moves.

7. In a drier, a settling chamber, a chambered chimney leading therefrom, the base of the settling chamber having inclined surfaces and downwardly disposed pipes in which the surfaces terminate.

Signed by me at the American embassy, Tokyo Japan this 10th day of February 1908.

KASHO TSUJI.

Witnesses:
 EDWIN L. NEVILLE,
 JAMES B. DAVIES.